(12) United States Patent
Grisenthwaite (10) Patent No.: US 6,851,033 B2
(45) Date of Patent: Feb. 1, 2005

(54) MEMORY ACCESS PREDICTION IN A DATA PROCESSING APPARATUS

(75) Inventor: Richard Roy Grisenthwaite, Guilden Morden (GB)

(73) Assignee: Arm Limited, Cambridge (GB)

( * ) Notice: Subject to any disclaimer, the term of this patent is extended or adjusted under 35 U.S.C. 154(b) by 261 days.

(21) Appl. No.: 10/260,545

(22) Filed: Oct. 1, 2002

(65) Prior Publication Data

US 2004/0064663 A1 Apr. 1, 2004

(51) Int. Cl.[7] .............................. G06F 12/00; G06F 9/38
(52) U.S. Cl. ...................... 711/169; 711/213; 711/218; 711/214; 711/137; 712/230; 712/239; 712/245
(58) Field of Search ................................ 711/169, 167, 711/214, 218, 204, 137, 213; 712/230, 214, 208, 245, 239

(56) References Cited

U.S. PATENT DOCUMENTS

| | | | | |
|---|---|---|---|---|
| 5,649,159 A | * | 7/1997 | Le et al. ...................... 711/163 |
| 5,771,365 A | * | 6/1998 | McMahan et al. ............ 712/205 |
| 6,629,234 B1 | * | 9/2003 | Col ................................ 712/219 |
| 2002/0026545 A1 | * | 2/2002 | Yoshida et al. ................ 710/56 |

FOREIGN PATENT DOCUMENTS

JP 02000305779 * 11/2000 ............. G06F/9/38

* cited by examiner

*Primary Examiner*—Pierre Bataille
(74) *Attorney, Agent, or Firm*—Nixon & Vanderhye P.C.

(57) ABSTRACT

The present invention relates to techniques for predicting memory access in a data processing apparatus and particular to a technique for determining whether a data item to be accessed crosses an address boundary and will hence require multiple memory accesses. An earlier indication can be provided that at least two memory accesses may be required to access a data item by performing a prediction based upon one or more operands generated from a memory instruction instead of waiting for a memory access generation stage to generate the memory access. Prediction logic can generate a prediction signal to prevent the memory access generation stage from receiving signals from a preceding pipeline stage while at least two memory accesses are being generated.

20 Claims, 6 Drawing Sheets

| | | | | | | |
|---|---|---|---|---|---|---|
| LDR | DE | ISS | EX | Mem | WB | |
| ADD | | DE | ISS | EX | Mem | WB |
| SUB | | | DE | ISS | EX | Mem | WB |

FIG 5B

| | | | | | | |
|---|---|---|---|---|---|---|
| LDR (LDR2) | DE | ISS | EX | Mem | WB | |
| ADD | | | DE | ISS | EX | Mem | WB |
| SUB | | | | DE | ISS | EX | Mem | WB |

FIG 5C

| | | | | | | |
|---|---|---|---|---|---|---|
| LDR | DE | ISS | EX | Mem | WB | |
| NOP | | DE | | | | |
| ADD | | | DE | ISS | EX | Mem | WB |
| SUB | | | | DE | ISS | EX | Mem | WB |

FIG. 6

MEMORY ACCESS PREDICTION IN A DATA PROCESSING APPARATUS

BACKGROUND OF THE INVENTION

1. Field of the Invention

The present invention relates to techniques for predicting memory access in a data processing apparatus.

2. Description of the Prior Art

A data processing apparatus will typically include a processor, for example a processor core, for executing a sequence of instructions that are applied to data items. Typically, a memory may be provided for storing the instructions and data items required by the processor core. Further, it is often the case that one or more caches are provided for storing instructions and data items required by the processor core, so as to reduce the number of accesses required to the memory.

It is known for such processor cores to incorporate one or more pipelines for executing instructions, each pipeline having a plurality of stages. The provision of pipelines enable multiple instructions to be in the process of execution at any one time which can increase the throughput and efficiency of the processor core. Typically, as instructions step through the pipeline any resources required to process those instructions such as data items from memory or registers are made available at the appropriate pipeline stage. Typically, a clock signal is provided which provides timing information to control the rate at which instructions step through the pipeline.

In an ideal scenario, each instruction spends one clock cycle in each pipeline stage, and then moves to the next pipeline stage. However, as will be appreciated by those skilled in the art, there are various scenarios in which it will be necessary to keep an instruction within a particular pipeline stage for more than one clock cycle, for example because the processing of that instruction required by that pipeline stage will require more than one clock cycle, or because processing of that instruction at that pipeline stage cannot take place in the current clock cycle because all of the information or data required to enable that processing to take place is not available. In such scenarios, the particular pipeline stage in question will issue one or more stall signals which are then processed by control logic of the pipelined processor to determine whether it is necessary to stall any preceding pipeline stages. The receipt of a stall signal by a pipeline stage prevents that stage from providing its instruction and any associated information or data to the next stage. Typically, assuming the immediately preceding pipeline stage contains an instruction, it will be stalled, and this stall will be replicated down the pipeline.

The processing speed of the pipeline is limited by its critical path which, in many implementations, is dependent on the minimum time needed by any one stage to generate and propagate a signal required to control stages during the next cycle. It will be appreciated that the critical path may be any path, but in many designs the critical path is often the time needed to generate and propagate, for example, the stall signal. Hence, even if the rate at which instructions step through the pipeline can be increased, the rate cannot be any faster than that minimum time needed by that stage to generate and propagate such signals.

To reduce complexity when accessing data items to or from memory, the memory is typically arranged such that only predetermined blocks of data may be accessed during a single access cycle. It will be appreciated that the size of the block is a matter of design choice, and may for example be selected to be that of the most commonly-accessed size of data item, for example a word. These blocks of data in the memory are delimited by so-called address boundaries. By accessing memory in blocks the memory interface can be simplified. Also, when accessing data items within adjacent address boundaries, it will be appreciated that the data items can be accessed in a single access cycle.

However, there may be instances where data items to be accessed are not within adjacent address boundaries. This occurs typically if a data item to be stored has a size which is different to the size of the blocks of data. This variation in size can occur for example when variable length coding is used. It is possible in situations where the data item to be stored is smaller than the size of the predetermined blocks for the data item to 'padded' with null data to make that data item align with the address boundaries. However, the use of padding is undesirable since it reduces the storage efficiency of the memory. Hence, if padding is not used then subsequent data items may be split across both sides of an address boundary. Also, if a data item is larger than the block then clearly that data item will be split across both sides of an address boundary. It will be appreciated that when the data item to be accessed is on both sides of an address boundary, multiple access cycles will be required to access that data item.

When processing a memory instruction (such as a load or store instruction) in the pipeline, an address in memory to be accessed will need to be generated usually by an arithmetic operation performed on operands associated with that memory instruction. The operands may be specified directly in the instruction itself, or by reference to the contents of one or more registers. It will be appreciated that a finite time will be required for such an address generation and that, typically, address generation takes most of a clock cycle.

In the particular case where the generated address indicates that the data item to be accessed crosses an address boundary then previous stages in the pipeline may need to be stalled whilst the multiple access takes place, since typically such multiple accesses will take more than one clock cycle. Given that a signal to stall previous stages cannot be issued and propagated to earlier stages in the pipeline until the address generation completes then it is clear that this can be a critical path in the processor. This is because the rate at which instructions are clocked through the pipeline is constrained by the speed at which the stall signal can be routed to the necessary pipeline stages following address generation. This constraint undesirably limits processing speed of the processor.

Accordingly, it is desired to provide an improved technique for determining whether a data item to be accessed crosses an address boundary and will hence require multiple memory accesses.

SUMMARY OF THE INVENTION

Viewed from a first aspect, the present invention provides a data processing apparatus comprising: a processor operable to execute instructions upon data items associated with a memory, said memory being arranged to store data delimited by address boundaries, said processor having a plurality of pipeline stages, including a memory access generation stage operable to generate from a memory instruction a memory access for a data item whose address is derived from one or more operands of said memory instruction, and in the event that said address indicates that said data item consists of data on both sides of one of said address boundaries, operable to generate at least two memory accesses to be output sequentially from said memory access generation stage to access said data item at addresses on both sides of said address boundary; prediction logic associated with said memory access generation stage and arranged to receive said one or more operands, to predict from said one or more operands whether said at least two memory accesses may be required to access said data item, and to generate a prediction signal indicative of said prediction; and control logic responsive to said prediction signal indicating that at least two memory accesses may be required to prevent at least said memory access generation stage of said processor from receiving signals from a preceding pipeline stage whilst said at least two memory accesses are being generated.

By performing a prediction based upon the operands of the memory instruction instead of waiting for the memory access generation stage to generate the actual address for the memory access, the prediction logic can generate the prediction signal to enable the control logic to prevent the memory access generation stage from receiving signals from a preceding pipeline stage whilst the address is still being generated. Accordingly, an earlier indication can be provided that at least two memory accesses may be required. Hence, this earlier indication causes a reduction in the critical path compared with the earlier described prior art technique, since there is no need to wait for the address to be generated. Advantageously, such an earlier indication may allow the speed at which instructions are clocked through the stages to be increased.

There will be circumstances where prediction based on the operands will result in a prediction signal being generated indicating that at least two memory accesses may be required when in fact the memory access generation stage will generate a memory instruction whose address is not on both sides of one of the address boundaries. However, the present invention realises that the probability of such occurrences will be low because the majority of data items will be aligned with address boundaries, and it is uncommon for two or more unaligned operands to actually give rise to an aligned address. Hence, the performance impact caused by the issue of the prediction signal in these circumstances is low when compared to the improvements made to the critical path of the processor.

In embodiments, the one or more operands comprise a plurality of bits and the prediction logic is operable to predict based upon a number of least significant bits of the one or more operands whether the at least two memory accesses may be required to access the data item.

The operands associated with a memory instruction will, in preferred embodiments, be a value represented by a plurality of bits. However, the prediction logic may utilise a subset of those bits (i.e. a number of least significant bits) in its prediction. By using just a number of least significant bits, the size of the prediction logic can be reduced.

In preferred embodiments, the address boundaries are arranged to delimit data comprising $2^N$ bytes and the address prediction logic is operable to predict based upon N least significant bits of the one or more operands whether the at least two memory accesses may be required to access the data item.

It will be appreciated that the operands which are used to generate the address of the data item could be of any size. However, in embodiments where the data is arranged in memory in blocks comprising $2^N$ bytes, it is possible to predict using only the N least significant bits of the operands whether more than one memory access may be required. This is because whilst each memory address is unique, the N least significant bits repeat within each $2^N$ block of data and the prediction logic can be arranged to predict when the least significant bits of the operands may result in an address which would result in more than one memory access.

In preferred embodiments, the prediction logic is operable to predict that the at least two memory accesses may be required to access the data item if any of the number of least significant bits of the one or more operands are set.

If address boundaries occur when the number of least significant bits are set to "0", such as when address boundaries occur at "xxxxx0", "xxxxx4", "xxxxx8" etc. hexadecimal, where "x" is a don't care condition and where the two least significant bits will be "0" at the address boundaries, then it is more likely than not that if any of the number of least significant bits of the operands used to generate that address are set to other than "0", then the generated address will not align with an address boundary and hence will result in more than one memory access being required. Hence, the prediction logic can be arranged to predict that at least two memory accesses may be required if any of the least significant bits of the operands are set.

In preferred embodiments, the prediction logic comprises a logic element associated with each operand which is operable to output a prediction signal indicating that at least two memory access may be required if any of the number of least significant bits of the associated operand are set.

By providing a logic element associated with each operand, a prediction signal can easily be generated for each operand indicating whether that operand is likely to result in at least two memory access being generated.

In preferred embodiments, the prediction logic further comprises combination logic operable to generate a single prediction signal for outputting to the control logic dependent on the prediction signal generated by each logic element.

By providing combination logic, a prediction signal can easily be generated if any operand indicates that at least two memory accesses may be necessary.

In one embodiment, the control logic is responsive to the prediction signal indicating that at least two memory accesses may be required to generate a stall signal for propagation to each preceding pipeline stage in turn, the stall signal causing those pipeline stages receiving the stall signal to stall whilst the at least two aligned memory accesses are being generated by the memory access generation stage.

Hence, on the issue of a stall signal from the address generation stage, each earlier stage in the pipeline is prevented by the stall signal from receiving further instructions. Accordingly, the processing of earlier instructions in the pipeline is stalled whilst the address generation stage generates the at least two memory accesses. This ensures that no instructions or data are lost whilst the memory accesses take place.

In an alternative embodiment, at a point in time each pipeline stage either contains an instruction or does not contain an instruction, and the control logic is responsive to the prediction signal indicating that at least two memory accesses may be required to generate a stall signal for propagation to each preceding pipeline stage in turn until a pipeline stage containing no instruction is encountered, the stall signal causing those pipeline stages receiving the stall signal to stall whilst the at least two aligned memory accesses are being generated by the memory access generation stage.

In such an embodiment, on the issue of a stall signal from the address generation stage, earlier stages in the pipeline which contain an instruction may be prevented by the stall signal from receiving further instructions whilst stages upstream (i.e. preceding) from the address generation stage which do not contain an instruction (empty stages), and stages upstream from empty stages, remain free to receive and process further instructions. Hence, only that part of the pipeline that would result in instructions or data being lost if they continued to process those instructions is stalled, whilst that part of the pipeline which would not cause instructions or data to be lost remain free to execute further instructions. It will be appreciated that this can increase the efficiency of the pipeline during the at least two memory accesses.

In one embodiment, the memory access generation stage is operable in the event that the prediction logic generated a prediction signal indicating that at least two memory accesses may be required to access the data item, but the subsequently generated memory access for the data item indicates that the data item consists of data not on both sides of one of the address boundaries, to generate a null operation following the generation of a first memory access.

Hence, in the uncommon situation where the prediction logic predicted, using the operands, that an unaligned access will take place but in fact the generated address is an aligned address, the memory access generation stage will generate a signal indicating that a null operation should take place during the cycle where it was predicted that the second aligned memory access would occur.

In preferred embodiments, the memory access generation stage takes a time 't' to generate from the memory instruction a memory access for the data item and the prediction logic takes a time less than 't' to generate from the one or more operands the prediction signal.

Hence, because the prediction logic takes less time to generate the prediction signal than the memory access generation stage takes to generate a memory access, the prediction signal can be provided at an earlier point in time to preceding stages which reduces the critical path in the processor.

In embodiments, the memory instruction may be a load instruction for loading a data item from the memory into a register of a register bank accessible by the processor.

In embodiments, the memory instruction may also be a store instruction for storing a data item from a register of a register bank accessible by the processor into the memory.

Viewed from a second aspect, the present invention provides in a data processing apparatus comprising a processor operable to execute instructions upon data items accessed from a memory, the memory being arranged to store data delimited by address boundaries, the processor having a plurality of pipeline stages, including a memory access generation stage for generating from a memory instruction a memory access for a data item whose address is derived from one or more operands of the memory instruction, and in the event that the address indicates that the data item consists of data on both sides of one of the address boundaries, for generating at least two memory accesses to be output sequentially from the memory access generation stage to access the data item from memory addresses on both sides of the address boundary, a method of predicting whether the at least two memory accesses may be required to access the data item, comprising the steps of: (i) receiving the one or more operands; (ii) predicting from the one or more operands whether the at least two memory accesses may be required to access the data item; (iii) generating a prediction signal indicative of the prediction; and (iv) preventing, responsive to the prediction signal indicating that at least two memory accesses may be required, at least the memory access generation stage of the processor from receiving signals from a preceding pipeline stage whilst the at least two memory accesses are being generated.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
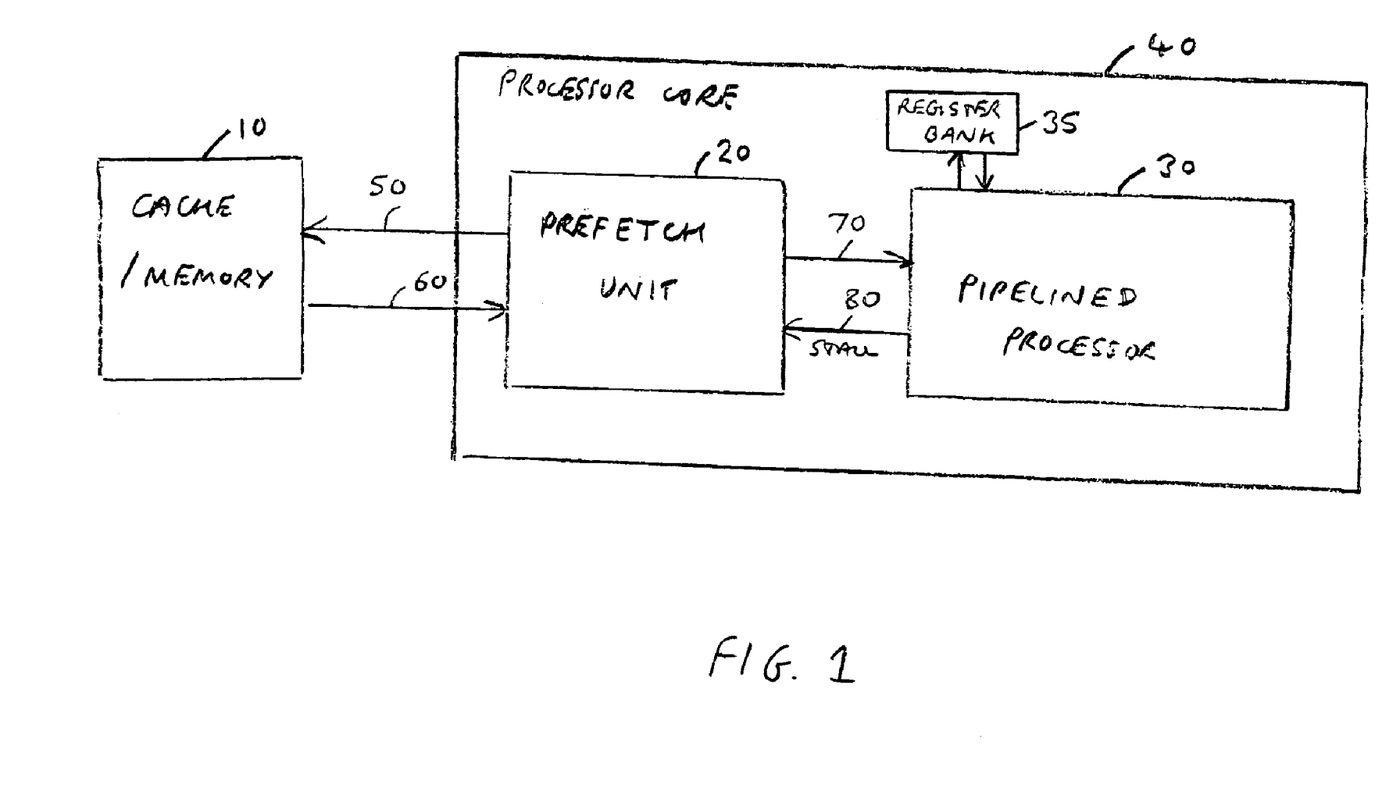
FIG. 1 is a block diagram of a system in which the techniques of preferred embodiments of the present invention may be implemented.

FIG. 1 is a block diagram illustrating a data processing system in which the techniques of preferred embodiments of the present invention may be employed. As shown in FIG. 1, a processor core 40 is coupled to a cache or other memory device 10 from which instructions required by the processor core 40 may be accessed. Within the processor core 40, a prefetch unit 20 is provided for issuing over path 50 requests for instructions determined by the prefetch unit to be required by the pipelined processor 30. The cache or other memory device 10 from which the instructions are retrieved then outputs the instructions back to the prefetch unit 20 over path 60, from where they are passed over path 70 into the pipelined processor 30. When executing instructions, the pipelined processor 30 will interface with the registers of register bank 35 containing data items to be manipulated by the instructions. Load instructions are used to load data items into the register bank 35 from the cache or other memory device 10, and store instructions are used to store data items into the cache or other memory device 10 from the register bank 35. Data processing instructions may then be executed on the data items stored in particular registers of the register bank 35.

In the event that any of the pipeline stages of the pipelined processor 30 becomes stalled, due to for example a particular instruction needing to stay for several cycles within a particular pipeline stage, then this may result in a stall signal being output to the prefetch unit 20 over path 80. Typically, the prefetch unit 20 will incorporate an instruction buffer for storing temporarily instructions retrieved over path 60 but which do not yet need to be issued to the pipelined processor 30 over path 70. Accordingly, the presence of a stall signal on path 80 will not necessarily cause the prefetch unit 20 to stall its operation, unless that internal instruction buffer within the prefetch unit 20 is full. Similarly, in the event that any of the pipeline stages within the pipelined processor 30 becomes stalled, a stall signal may be propagated within the pipelined processor 30 to cause one or more preceding stages in the pipeline to stall as will be explained in more detail below.

Figure 2:
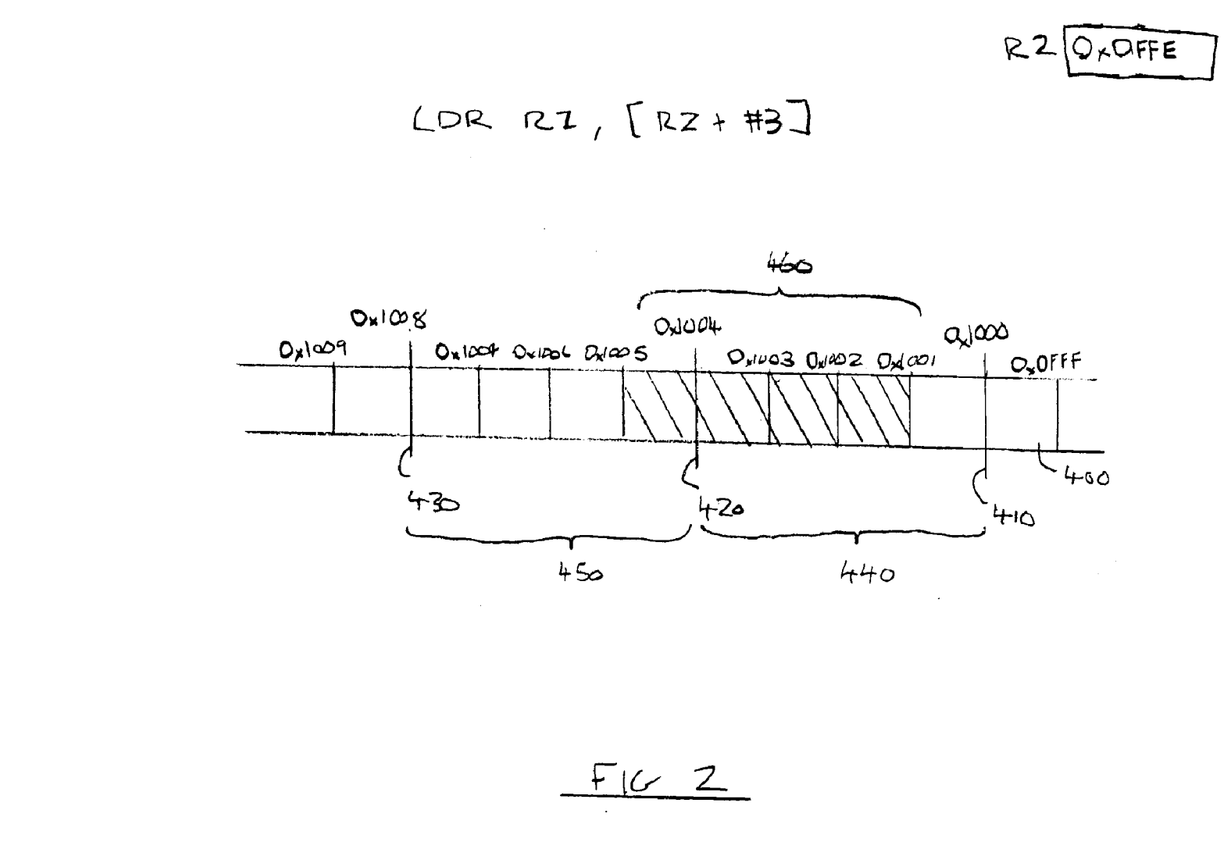
FIG. 2 is a diagram illustrating the arrangement of the memory in which data is delimited by address boundaries.

The cache or other memory device 10 is arranged to store data as illustrated in FIG. 2. Data, such as a byte comprising 8 bits, is stored at one of a sequence of addresses in the cache or other memory device 10; for example, data 400 is stored at the address "0x0FFF", in hexadecimal notation.

To reduce complexity in the memory interface, data is stored and retrieved from the cache or other memory device 10 in predetermined blocks 440, 450, the blocks having a predetermined size. In this example, each block 440, 450 comprises a 4 byte word. However, it will be appreciated that the blocks could be of any suitable size.

Each block is delimited or separated by an address boundary. Each address boundary is offset from a previous address boundary in dependence on the selected size of the blocks. In this example, block 440 is delimited from other blocks by address boundaries 410 and 420, whilst block 450 is delimited from other blocks by address boundaries 420 and 430. Hence, block 440 comprises the data stored in the addresses "0x1000" to "0x1003" inclusive, whilst block 450 comprises the data stored in the addresses "0x1004" to "0x1007" inclusive. It will be appreciated that whilst in this example the start address of block 440 is "0x1000", the cache or other memory device 10 could be configured such that its start address was any of "0x1001" to "0x1003" with the start address of preceding and following blocks being offset by the predetermined block size.

The arrangement of data into blocks simplifies memory accesses. If a data item to be accessed is no larger than the size of a block, and its address aligns with an address boundary, then that data item may be accessed in a single access cycle. Hence, data items corresponding to either of blocks 440 or 450 can be accessed in a single access cycle by simply specifying the start or base address of the block corresponding to the data item to be accessed. On receipt of the address of the required data item, the cache or other memory device 10 is arranged to access the byte of data at that address and, in this example, the three bytes at the next three consecutive addresses within a single access cycle. Such an access is known as an "aligned" access since the data item to be accessed is aligned with the address boundaries and can be accessed in one access cycle.

However, there may be circumstances where the address of a data item to be accessed is not aligned with an address boundary. Such an access is known as an "unaligned" or "misaligned" access. The existence of an unaligned access can be readily established if it is determined that any portion of the data item to be retrieved crosses an address boundary.

The instruction shown in FIG. 2, namely "LDR R1, [R2, #3]", is an example of an instruction which, given the operands illustrated in FIG. 2, will result in an unaligned access. This instruction requires the pipelined processor 30 to retrieve a 4 byte data item stored at the specified address in the cache or other memory device 10 and to store that data item in the register R1 of the register bank 35. The specified address is determined by adding the contents of the register R2 to the "immediate", in this case the immediate having a value of "3". As shown in FIG. 2, the register R2 has the value "0x0FFE" stored therein. As will be described in more detail below, a memory access generation stage of the pipelined processor 30 will generate an address based upon the two operands (i.e. "0x0FFE" and "3") of the instruction. In this example, the generated address of the data item is "0x1001".

To access a data item at the address "0x1001", the pipelined processor 30 will need to generate two aligned memory accesses. The first aligned memory access will typically retrieve the block 440 by specifying the address "0x1000". The second aligned memory access will typically retrieve the block 450 by specifying the address "0x1004". The pipelined processor 30 will then concatenate the two retrieved blocks and isolate the relevant 4 bytes. It will be appreciated that other techniques could be used to provide the required 4 bytes but that at least two memory accesses will still be required.

Given that for a single instruction which results in an unaligned memory access, two memory accesses will be required, it will be appreciated that the instruction will remain in a particular stage of the pipelined processor 30 for at least two cycles. As mentioned above, in these circumstances, a stall signal will need to be propagated to earlier or preceding stages of the pipeline in order to prevent any instructions or data being overwritten or lost.

Figure 3:
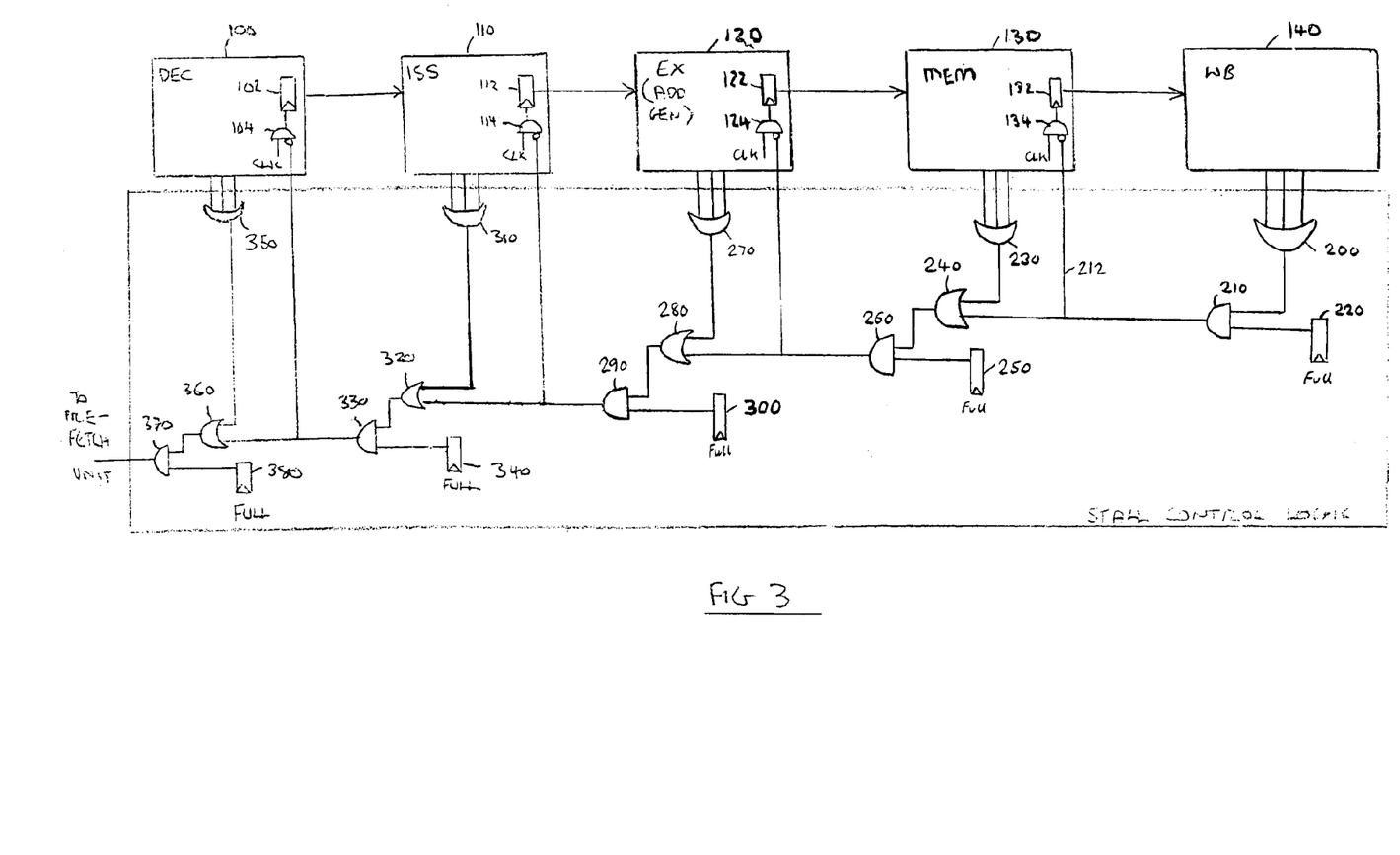
FIG. 3 is a schematic diagram illustrating one arrangement of the different stages of the pipeline and the stall control logic.

FIG. 3 illustrates one arrangement of the pipelined processor 30 of FIG. 1 in which five stages are provided, together with the stall control logic.

At stage 100, an instruction received from the prefetch unit 20 is decoded, and is then subsequently passed to the issue stage 110, where the data required by the instruction is obtained from the appropriate registers of the register bank 35. In this arrangement the instructions and data are 32-bit.

Thereafter, the instruction moves to the execute/address generation stage 120. For a load or store operation, the process performed at this stage is to generate the address required for the memory access that is to be used to effect the load or store operation. As mentioned above, this process will typically involve adding together operands obtained, for example, from two registers, or by adding the value of a register to an "immediate" value specified within the instruction, etc.

In the event that the load or store instruction generates an address that is aligned with an address boundary, that address is passed to the memory access stage 130 which accesses the data item specified by the instruction.

However, when the load or store instruction generates an address that is not aligned with an address boundary, a first aligned address is passed to the memory access stage 130 which accesses a portion of the data item specified by the instruction and then a second aligned address is passed to the memory access stage 130 which accesses the remainder of data item specified by the instruction. Given that, for an unaligned access, an extra instruction (the access of the second aligned address) is effectively inserted by the execute/address generation stage 120 into the pipeline, it is necessary to prevent instructions already in the pipeline from being overwritten, or lost and to prevent the extra instruction from being corrupted by those instructions. This is achieved by the issue of a stall signal which is generated by the execute/address generation stage 120 as will be described in more detail below with reference to FIG. 4.

When the memory access has completed, the instruction will move from the memory stage 130 into the write back stage 140. In the write back stage 140, the register bank 35 is prepared for updating to reflect the result of the load or store operation, that update taking place at the end of the write back stage.

Any stall signals (in preferred embodiments the stall signal being set to a logic one value to indicate a stall)

generated by the decode stage 100, the issue stage 110, the execute/address generation stage 120, the memory stage 130 or the write back stage 140 are output to corresponding OR gates 350, 310, 270, 230, 200, respectively. It will be appreciated that in some embodiments not all stages need necessarily be arranged to stall.

If a stall signal is generated by the write back stage 180, then this will be output via the OR gate 200 to AND gate 210, which will then output that stall signal provided that an input received from flip-flop 220 confirms that the write back stage 180 is "full", i.e. contains an instruction. It will be appreciated by those skilled in the art that the AND gate 210 may not be necessary if the stall signal is to be generated regardless of whether or not the write back stage 180 is full.

A set stall signal output by AND gate 210 will be routed via path 212 to AND gate 134, where that signal is inverted prior to entering the AND gate 134. Hence, this will ensure that a clock signal is only output to flip-flop 132 if a stall signal has not been issued by the write back stage 140. In the event of a stall signal issued by write back stage 140, the flip-flop 132 will not receive a clock signal, and accordingly will not generate any output to the write back stage 140 at that time. It will be appreciated by those skilled in the art that although only a single flip-flop 132 is illustrated in FIG. 3, there will typically be a number of flip-flops at the output of each pipeline stage, and they would all be controlled in a similar manner.

OR gate 240 serves to OR together any stalled signals generated by the memory stage 130 or by the write back stage 140, with the output of OR gate 240 then being passed to AND gate 260. AND gate 260 will then output any stall signal received from OR gate 240 provided that flip-flop 250 indicates that the memory stage 130 is full.

In the event of a stall signal being output by AND gate 260, this will cause AND gate 124 to suppress generation of the clock signal to flip-flop 122, and accordingly to ensure no output is passed by the execute/address generation stage 120 to the memory stage 130.

OR gate 280 then serves to OR together any stall signals generated by the execute/address generation stage 120 with any stall signal output from AND gate 260, with any resulting stall signal then being routed to AND gate 290 for outputting from the AND gate 290 if flip-flop 300 indicates that the execute/address generation stage 120 is full. The output from AND gate 290 is then passed to the issue stage 110 for propagation in an analogous manner through the rest of the pipeline stages.

From the above description of FIG. 3, it will be appreciated that the stall signal basically propagates back down the pipeline to stall all preceding pipeline stages unless an empty pipeline stage is encountered. As soon as an empty pipeline stage is encountered, the stall signal is suppressed so as to allow any preceding pipeline stages to operate normally. By allowing new instructions to move into empty pipeline stages during a stall, the efficiency of the pipeline is improved during the issue of a stall signal. Alternatively, stall control logic could be provided which simply propagated a stall signal to every preceding stage in the pipeline irrespective of whether it contained an instruction or not. It will be appreciated that this would reduce the efficiency of the pipeline but would also simplify the stall control logic.

Figure 4:
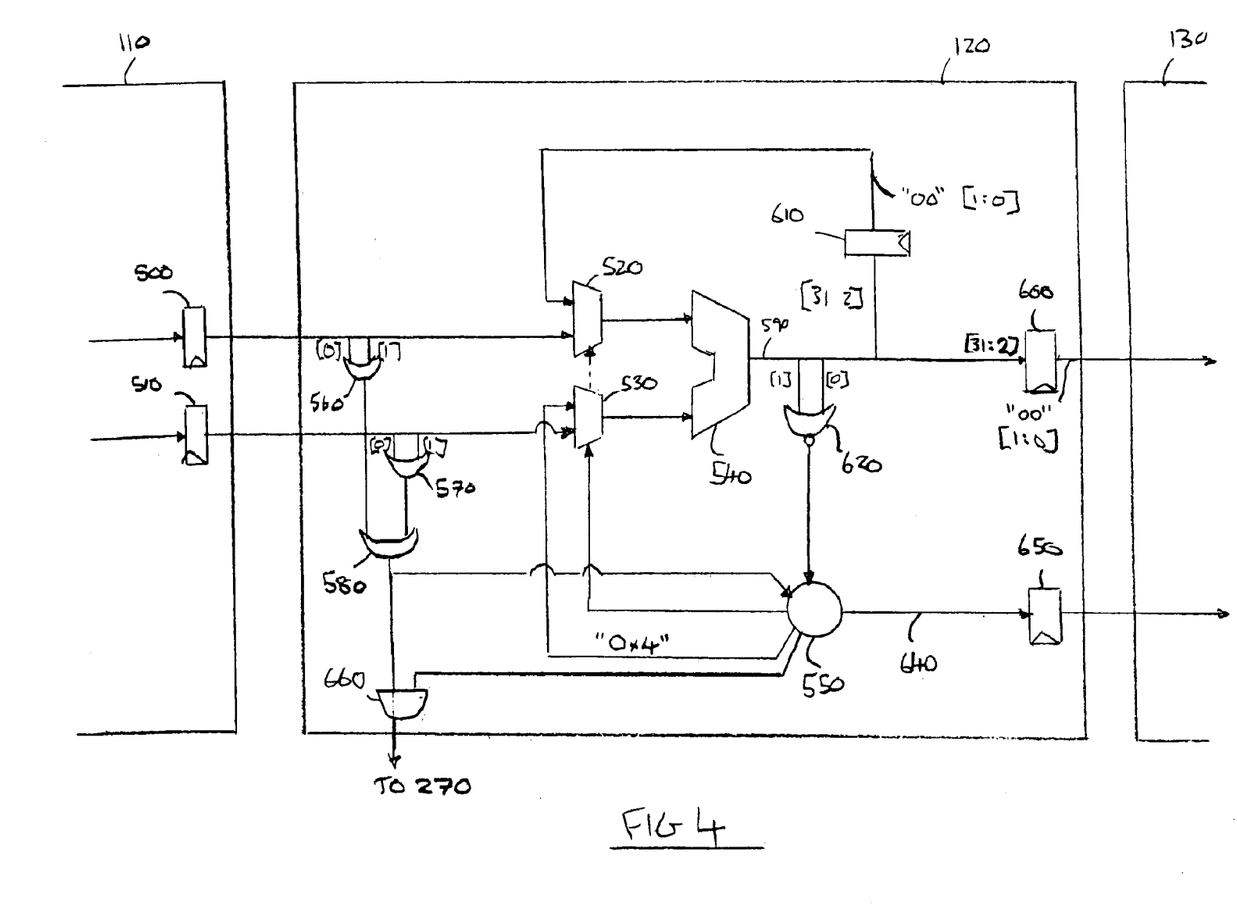
FIG. 4 is a schematic diagram illustrating components of the address generation stage of the pipeline.

FIG. 4 is a schematic diagram illustrating components of the execution/address generation stage 120 of the pipeline. The execution/address generation stage 120 receives, amongst other signals, operands associated with an instruction from the flip-flop 112 of the issue stage 110 and generates one or more memory addresses for outputting to the memory stage 130, along with any stall signals to the stall control logic that may be required.

A first 32-bit operand stored in a flip-flop 500 of the flip-flop 112 is provided to a first input of a multiplexer 520. A second 32-bit operand stored in a flip-flop 510 of the flip-flop 112 is provided to a first input of a multiplexer 530. The output of the multiplexers 520, 530 are controlled by control logic 550 as described below. An adder 540 receives the outputs from the multiplexers 520, 530, and adds them together to generate an address.

OR gates 560, 570, 580 are used to generate a stall prediction signal indicative of whether more than one memory access may be required.

This prediction takes advantage of the realisation that in preferred embodiments where the first predetermined block in memory has a start or base address of "0x0000" hexadecimal and each block comprises 4 entries, then the two least significant bits of every aligned address will be "00" binary. It follows, therefore, that if any of the two LSBs of the address are set to a logical "1" then the address will be unaligned and more than one memory access will be required.

The prediction also realises that in most cases, if one of the operands is unaligned, the resulting address generated by the adder 540 will also be unaligned. Hence, it is possible to predict whether an unaligned memory access may occur using, in this example, the two LSBs of the operands. Accordingly, if either LSB of either operand is set to a logical "1" then it is likely that an unaligned address will be generated by the adder 540. Conversely, if the two LSBs of each operand is set to a logical "0", then it is clear that an aligned address will be generated by the adder 540.

Hence, an OR gate 560 is coupled to bits [1:0] (the two LSBs) of the first 32- bit operand provided by the flip-flop 500. If either of these two LSBs has a logic level of "1", indicating a possible unaligned access, then the OR gate 560 outputs a logical "1" to an input of an OR gate 580. An OR gate 570 is coupled to bits [1:0] (the two LSBs) of the second 32-bit operand provided by the flip-flop 500. If either of these two LSBs have a logic level of "1", indicating a possible unaligned access, then the OR gate 570 outputs a logical "1" to another input of the OR gate 580. Should the OR gate 580 receive a logic level of "1" at either of its inputs then the OR gate 580 will output a stall prediction signal having a logical value of "1" to an AND gate 660 and to control logic 550 within the execute/address generation stage 120. The AND gate 660 is provided to ensure that the stall prediction signal is only issued to the stall control logic during the first aligned memory access of an unaligned access. As will be explained in more detail below, the control logic 550 receives the stall prediction signal and outputs a logical '1' to the AND gate 660 during the first aligned memory access to enable the stall prediction signal to be propagated to the stall control logic.

To illustrate the operation of the execute/address generation stage 120, the processing of the example LDR R1, [R2, #3] instruction of FIG. 2 will now be described. The contents of the register R2 is provided by the flip-flop 500 as the first operand. "0x0FFE" is provided as a 32-bit value, having "10" as the two LSBs which causes the OR gate 560 to output a logical "1". Similarly, the immediate "3" is provided by the flip-flop 510 as the second operand. "3" is provided as a 32-bit value, having "11" as the two LSBs which causes the OR gate 467 to output a logical "1". The OR gate 580 receives the outputs from the OR gates 560, 570 and also outputs a stall prediction signal have a value of a logical "1" indicating that a misaligned memory access may occur. The control logic 550 receives the stall prediction signal and outputs a logical '1' to the AND gate 660 during the first aligned memory access. The AND gate 660 also receives the stall prediction signal which is then output to the stall control logic. The stall control logic receives the stall prediction signal and propagates stall signals to upstream (i.e. preceding) stages in the pipeline and to control logic 550 within the execute/address generation stage 120.

It will be appreciated that because simple logic gates are used to generate the stall prediction signal, the time taken to generate that stall prediction signal will be significantly less than the time taken to gate the operands into the adder 540, perform the necessary address generation based on those operands, output the result, evaluate the result to determine whether an unaligned access is to take place and then to generate any stall signal which may need to be propagated to preceding stages in the pipeline. This reduction in the time needed to generate any stall signal significantly reduces the critical path of the pipeline.

Whilst in this preferred embodiment, due to the particular size of the data blocks and the locations of the address boundaries of those data blocks, a potential unaligned access can be readily determined by detecting whether any bit of the two LSBs of the operands is set to a logical "1" using OR gates, it will be appreciated that in other arrangements of the address boundaries then other combinational logic may be required. For example, if the address of the first block was other than "0x0000", such as "0x0003" hexadecimal for example, then the combinational logic would need to be arranged such that the stall prediction signal is generated when the LSBs of the operands had a value other than "11" binary. Also, if each block instead comprises eight bytes then the number of LSBs of the operands that would need to be evaluated would be three, sixteen bytes per block would need four LSBs to be evaluated, and so on.

The generated 32-bit address output by the adder 540 is provided on the 32-bit bus 590. The 30 most significant bits (MSBs) of the generated address (i.e. bits [31:2]) are provided to the flip-flop 600. The execute/address generation stage 120 is arranged to only output aligned addresses. In this embodiment, the two LSBs of all aligned addresses have the value "00" binary. Hence, the value "00" binary is appended to the MSBs provided to the flip-flop 600.

In the case where the stall prediction signal has a value of "0" indicating that an aligned memory access will take place, the adder 540 will output the memory address to the memory stage towards the end of the cycle. On the next cycle, new operands associated with the next instruction in the pipeline will be provided by the flip-flop 112 for processing by the prediction logic and the adder 540, and so on.

In the case where the stall prediction signal has a value of "1" indicating that an unaligned memory access may take place, the adder 540 will output a first aligned memory address, which is output to the memory stage at the beginning of the next cycle. Also, the control logic 550 will output a logical '1' to the AND gate 660 so that the stall prediction signal may be propagated to the stall control logic. On the next cycle, the operands associated with the next instruction in the pipeline will remain in the issue stage 110 due to the supply of the stall prediction signal to the stall control logic. However, also during this next cycle the first aligned memory address is recirculated to multiplexer 520 and the control logic 550 provides the value "100" binary to the multiplexer 530. The control logic 550 causes the multiplexers 520 and 530 to provide the recirculated first aligned memory address and the value "100" binary to the adder 540. This enables the second aligned memory address to be generated such that the next block in the cache or other memory device 10 may be accessed in a subsequent cycle, and the stall prediction signal then is cleared by the control logic 550 which outputs a logical '0' to the AND gate 660 to prevent the stall prediction signal from being output to the stall control logic. Thereafter, in the next cycle, the operands associated with the instruction which was stalled in the issue stage 110 is provided by the flip-flop 112 for processing by the prediction logic and the adder 540, and so on.

To illustrate the operation of the execute/address generation stage 120, the continued processing of the example LDR R1, [R2, #3] instruction of FIG. 2 will now be described. The adder 540 will output a 32-bit address corresponding to "0x1001" hexadecimal towards the end of a cycle. The 30 MSBs of that address are provided to the flip-flops 600 and 610, and the two LSBs are set to have the value "00" binary. The control logic 550 issues a signal over the path 640 to the memory stage 130 indicating a valid address.

On the next cycle, the first aligned memory address having a value of "0x1000" hexadecimal is output to the memory stage 130 and instructions in the preceding pipeline stages will be stalled. Also, during that next cycle, the 30 MSBs of first aligned memory address provided by the flip-flop 610 and the two LSBs having the value "00" binary are provided to the input of the multiplexer 520. The control the control logic 550 provides the value "100" binary to the multiplexer 530. The control logic 550 causes the multiplexers 520 and 530 to provide the recirculated first aligned memory address and the value "100" binary to the adder 540. The adder then outputs the second aligned memory address having a value of "0x1004" hexadecimal to the 32-bit bus 590 towards the end of that next cycle. The 30 MSBs of second aligned address are provided to the flip-flops 600 and 610, and the two LSBs are set to have the value "00" binary. The control logic 550 maintains the signal over the path 640 to the memory stage 130 indicating a valid address.

On following cycle, the second aligned memory address having a value of "0x1004" hexadecimal is output to the memory stage 130 and the instruction from the issue stage 110 will enter the execute/memory address generation stage 120.

It will be appreciated that there will be circumstances where an unaligned access is predicted, but the generated address is aligned and hence a stall signal would have been generated unnecessarily. However, the prediction takes advantage of the realisation that most memory accesses generated by the pipelined processor 30 will be aligned and that it is uncommon for an unaligned operand to actually give rise to an aligned access. Hence, the frequency at which unaligned accesses are predicted will be low and the number of predicted unaligned accesses which actually result in an aligned access will be even lower. This apparent reduction in performance due to the unnecessary issue of a stall signal is more than compensated for by the reduction in the critical path of the processor since, as will be explained in more detail below, the stall signal can be generated and propagated much earlier, thereby allowing the frequency at which instructions are clocked through the pipeline to be increased.

The case where the stall prediction signal has a value of "1" indicating that an unaligned memory access will take place, but where the adder 540 generates an aligned memory access will now be described.

The control logic 550 will have received the stall prediction signal indicating that, based on the operands, an unaligned memory access may take place. As an example, such a prediction would occur for the operands "0x0011" and "0x0001". In this situation, preceding stages of the pipeline will have been stalled by the stall control logic. However, once the adder 540 generates the memory address, the NOR gate 620 receives bits [0] and [1] (the two LSBs) from the 32-bit bus 590 and in the case that an aligned address is generated outputs a logical "1" to the control logic 550. The control logic then realises that a stall prediction signal has been issued but an aligned memory access has been generated. Accordingly, in the next cycle, the control logic 550 issues a signal over the path 640 to the memory stage 130 indicating that any address output over path 590 in that cycle is invalid. The memory stage 130 receives the signal indicating an invalid address is being received from the execute/address generation stage 120 and performs a null operation (NOP). This NOP is then stepped through the remaining stages of the pipeline as required.

Figure 5A:
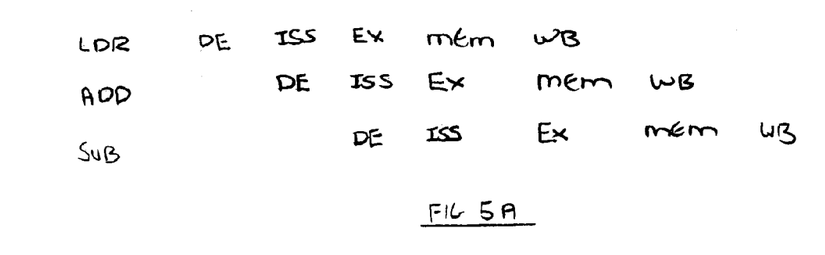
FIGS. 5A to 5C illustrate the progress of an example sequence of instructions through the pipelined processor of FIG. 3 for various worked examples.
Figure 5B:
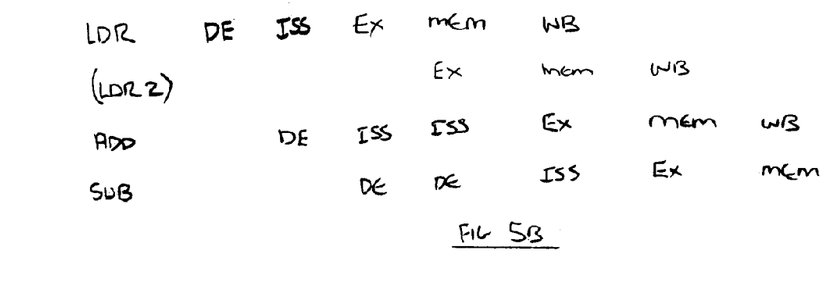
Figure 5C:
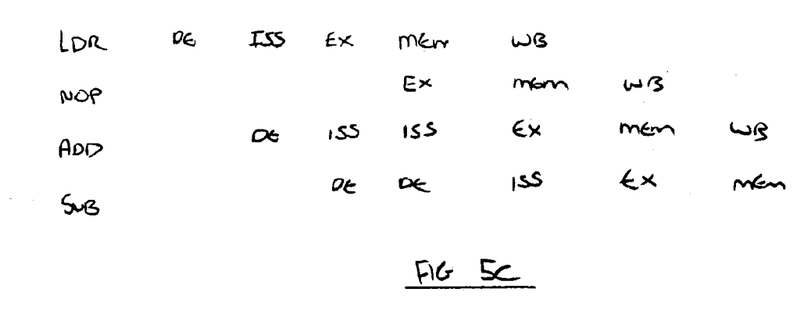

FIGS. 5A to 5C illustrate the progress of an example sequence of instructions through the pipelined processor of FIG. 3 for various worked examples.

In FIG. 5A, the progress of a LDR (load register) instruction whose operands predict an aligned memory access is illustrated. As can be seen, the LDR instruction is passed from one stage of the pipeline to the next, from the decode stage 100 through to the write back stage 140. The LDR instruction only spends a single cycle in each stage before progressing to the next.

The ADD instruction follows the LDR instruction in the pipeline and the SUB instruction follows the ADD instruction.

At the execute/address generation stage 120, the prediction logic predicts based upon the operands that an aligned memory access may take place. Hence, no prediction signal indicating that an unaligned memory access may take place is issued, and so no stall signal is produced. The memory address once generated is passed to the memory stage 130 to enable the memory access to take place. The control logic 550 determines that the memory address is aligned and issues a signal over the path 640 to the memory stage 130 indicating a valid address.

In FIG. 5B, the progress of a LDR (load register) instruction whose operands predict an unaligned memory access is illustrated. As can be seen, the LDR instruction is passed from one stage of the pipeline to the next as above.

At the execute/address generation stage 120, the prediction logic predicts based upon the operands that an unaligned memory access may take place. Hence, a prediction signal indicating that an unaligned memory access may take place is issued. Later in that same cycle, the first aligned memory address is generated by the execute/address generation stage 120 and it is determined by the control logic 550 that the prediction was correct and a signal is issued over the path 640 to the memory stage 130 indicating a valid address.

Hence, in the next cycle the second aligned memory address is generated by execute/address generation stage 120, and the signal is maintained on the path 640 indicating a valid address, whilst the memory stage 130 performs the memory access associated with the first aligned memory address (illustrated as LDR2).

To enable the execute/address generation stage 120 to generate the second aligned memory address, previous stages in the pipeline are stalled by the stall control logic in response to the issue of the prediction signal. Hence, the ADD instruction remains in the issue stage 110 for a further cycle and the SUB instruction remains in the decode stage 100 for the same further cycle whilst the second aligned memory access is generated.

In FIG. 5C, the progress of a LDR (load register) instruction whose operands predict an unaligned memory access but which results in an aligned memory access is illustrated. As can be seen, the LDR instruction is passed from one stage of the pipeline to the next as above.

At the execute/address generation stage 120, the prediction logic predicts based upon the operands that an unaligned memory access may take place. Hence, a prediction signal indicating that an unaligned memory access may take place is issued. Later in that same cycle, a memory address is generated by the execute/address generation stage 120 which is in fact an aligned address. Control logic in the execute/address generation stage 120 identifies that a prediction signal has already been issued which has stalled the previous stages of the pipeline, but that no additional memory access is required. Hence, the control logic provides a signal indicating an invalid address. The memory stage 130 receives the signal indicating an invalid address is being received from the execute/address generation stage 120 and performs a null operation (NOP). This NOP is then stepped through the remaining stages of the pipeline in place of a second memory access.

Hence, the ADD instruction remains in the issue stage 110 for a further cycle and the SUB instruction remains in the decode stage 100 for the same further cycle whilst the NOP instruction is generated. As mentioned above, it will be appreciated that most memory accesses generated by the pipelined processor 30 will be aligned and, hence, the frequency at which unaligned accesses are predicted will be low. Also, it will also be appreciated that it will be uncommon for an unaligned operand to actually give rise to an aligned access and, hence, the number of predicted unaligned accesses which actually result in an aligned access will be even lower. Accordingly, any reduction in performance due to the unnecessary issue of a stall signal is more than compensated for by the reduction in the critical path of the processor since the stall signal can be generated and propagated much earlier, thereby allowing the frequency at which instructions are clocked through the pipeline to be increased.

Figure 6:
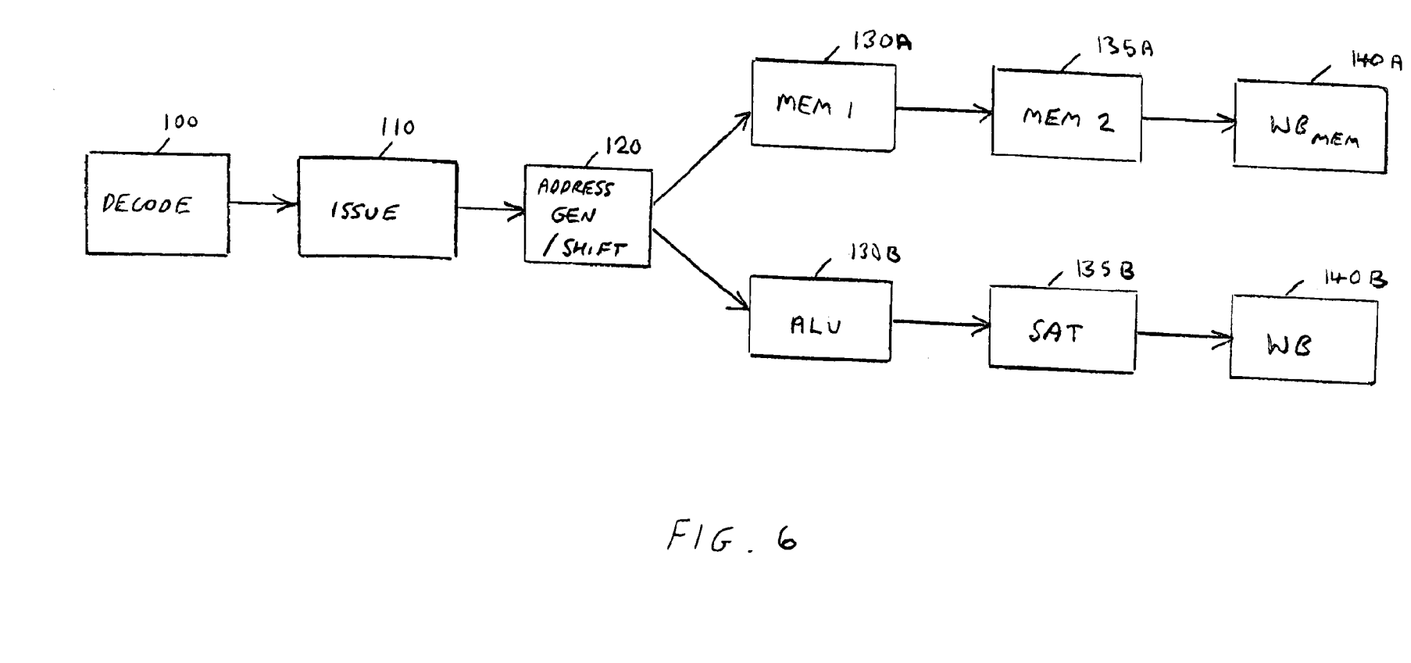
FIG. 6 is a schematic diagram illustrating another arrangement of the different stages of the pipeline.

FIG. 6 is a block diagram illustrating a different arrangement of the various pipeline stages that may be provided within the pipelined processor 30 of FIG. 1. At stage 100, an instruction received from the prefetch unit 20 is decoded, and is then subsequently passed to the issue stage 110, where the data required by the instruction is obtained from the appropriate registers of the register bank 35.

Thereafter, the instruction moves to the address generation/shift stage 120. For a load or store operation, the process performed at this stage is to generate the address required for the memory access that is to be used to effect the load or store operation. This process will typically involve adding together operands obtained, for example, from two registers, or by adding the value of a register to an "immediate" value specified within the instruction, etc. For an arithmetic logic instruction, for example an add instruction or a subtract instruction, pipeline stage 120 provides shift logic to enable any required shifting of the operands to be performed.

At this point, the processor branches into two pipelines, the first pipeline containing pipeline stages 130A, 135A and 140A, and the second pipeline containing pipeline stages 130B, 135B and 140B. The first pipeline is a load/store pipeline used to process load or store instructions, and accordingly a load or store instruction will be routed from pipeline stage 120 into pipeline stage 130A. Stages 130A and 135A are two memory pipeline stages, during which the memory access required by the load or store instruction takes place. There are two memory stages 130A, 135A, since load and store operations in this example will typically take at least two clock cycles.

When the memory access has completed, the instruction will move from the memory 2 pipeline stage 135A into the write back stage 140A. In the write back stage 140A, the register bank 35 is prepared for updating to reflect the result of the load or store operation, that update taking place at the end of the write back stage.

Any arithmetic logic instructions, such as add or subtract instructions, will be routed from the pipeline stage 120 into the pipeline stage 130B of the second pipeline, which incorporates an arithmetic logic unit for executing that arithmetic logic instruction. After the execution stage, the instruction is passed to the saturation stage 135B of the pipeline, where any required saturation of the result is performed. For example, some arithmetic logic instructions require that the result is saturated to a predetermined number of bits, and hence as an example may require a 16 bit result to be saturated to a 9 bit result. Such a process is performed within pipeline stage 135B. After any required saturation, the instruction is then passed to the write back stage 140B. As described earlier with reference to the write back stage 140A, the purpose of the write back stage 140B is to update the state of the data processing apparatus, and in particular to update the register bank 35, having regard to the result of execution of the instruction in the write back stage.

In an ideal scenario, each instruction spends one cycle in each pipeline stage, and then moves to the next pipeline stage. However, as will be appreciated by those skilled in the art, there are various scenarios in which it will be necessary to keep an instruction within a particular pipeline stage for more than one clock cycle, for example because the processing of that instruction required by that pipeline stage will require more than one clock cycle, or because processing of that instruction at that pipeline stage cannot take place in the current clock cycle because all of the information or data required to enable that processing to take place is not available. In such scenarios, the particular pipeline stage in question will issue one or more stall signals which are then processed by control logic of the pipelined processor to determine whether it is necessary to stall any preceding pipeline stages. Typically, assuming the immediately preceding pipeline stage contains an instruction, it will be stalled, and this stall will be replicated down the pipeline.

In one embodiment, all preceding pipeline stages will always be stalled upon issuance of the stall signal, whilst in an alternative embodiment, the preceding pipeline stages will only be stalled until such a point is reached where an empty pipeline stage exists. At that point, a stall is no longer required, since that empty pipeline stage will still be available to receive an input from a preceding pipeline stage. It will be appreciated that logic used in preferred embodiments to effect this latter type of stall propagation within the pipelined processor 30 can be similar to that illustrated schematically with reference to FIG. 3 which illustrates five stages of the first pipeline used to handle load/store instructions.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus comprising:
   a processor operable to execute instructions upon data items associated with a memory, said memory being arranged to store data delimited by address boundaries, said processor having a plurality of pipeline stages, including a memory access generation stage operable to generate from a memory instruction a memory access for a data item whose address is derived from one or more operands of said memory instruction, and in the event that said address indicates that said data item consists of data on both sides of one of said address boundaries, operable to generate at least two memory accesses to be output sequentially from said memory access generation stage to access said data item at addresses on both sides of said address boundary;
   prediction logic associated with said memory access generation stage and arranged to receive said one or more operands, to predict from said one or more operands whether said at least two memory accesses may be required to access said data item, and to generate a prediction signal indicative of said prediction; and
   control logic responsive to said prediction signal indicating that at least two memory accesses may be required to prevent at least said memory access generation stage of said processor from receiving signals from a preceding pipeline stage whilst said at least two memory accesses are being generated.

2. The data processing apparatus of claim 1, wherein said one or more operands comprise a plurality of bits and said prediction logic is operable to predict based upon a number of least significant bits of said one or more operands whether said at least two memory accesses may be required to access said data item.

3. The data processing apparatus of claim 2, wherein said address boundaries are arranged to delimit data comprising $2^N$ bytes and said address prediction logic is operable to predict based upon N least significant bits of said one or more operands whether said at least two memory accesses may be required to access said data item.

4. The data processing apparatus of claim 2, wherein said prediction logic is operable to predict that said at least two memory accesses may be required to access said data item if any of said number of least significant bits of said one or more operands are set.

5. The data processing apparatus of claim 2, wherein said prediction logic comprises a logic element associated with each operand which is operable to output a prediction signal indicating that at least two memory access may be required if any of said number of least significant bits of the associated operand are set.

6. The data processing apparatus of claim 5, wherein said prediction logic further comprises combination logic operable to generate a single prediction signal for outputting to said control logic dependent on said prediction signal generated by each logic element.

7. The data processing apparatus of claim 1, wherein said control logic is responsive to said prediction signal indicating that at least two memory accesses may be required to generate a stall signal for propagation to each preceding pipeline stage in turn, said stall signal causing those pipeline stages receiving said stall signal to stall whilst said at least two aligned memory accesses are being generated by said memory access generation stage.

8. The data processing apparatus of claim 1, wherein at a point in time each pipeline stage either contains an instruction or does not contain an instruction, and said control logic is responsive to said prediction signal indicating that at least two memory accesses may be required to generate a stall signal for propagation to each preceding pipeline stage in turn until a pipeline stage containing no instruction is encountered, said stall signal causing those pipeline stages receiving said stall signal to stall whilst said at least two aligned memory accesses are being generated by said memory access generation stage.

9. The data processing apparatus of claim 1, wherein said memory access generation stage is operable in the event that said prediction logic generated a prediction signal indicating that at least two memory accesses may be required to access said data item, but said subsequently generated memory access for said data item indicates that said data item consists of data not on both sides of one of said address boundaries, to generate a null operation following the generation of a first memory access.

10. The data processing apparatus of claim 1, wherein said memory access generation stage takes a time 't' to generate from said memory instruction a memory access for said data item and said prediction logic takes a time less than 't' to generate from said one or more operands said prediction signal.

11. The data processing apparatus of claim 1, wherein said memory instruction is a load instruction for loading a data item from said memory into a register of a register bank accessible by said processor.

12. The data processing apparatus of claim 1, wherein said memory instruction is a store instruction for storing a data item from a register of a register bank accessible by said processor into said memory.

13. In a data processing apparatus comprising a processor operable to execute instructions upon data items associated with a memory, said memory being arranged to store data delimited by address boundaries, said processor having a plurality of pipeline stages, including a memory access generation stage operable to generate from a memory instruction a memory access for a data item whose address is derived from one or more operands of said memory instruction, and in the event that said address indicates that said data item consists of data on both sides of one of said address boundaries, to generate at least two memory accesses to be output sequentially from said memory access generation stage to access said data item at memory addresses on both sides of said address boundary, a method of predicting whether said at least two memory accesses may be required to access said data item, comprising the steps of:

(i) receiving said one or more operands;

(ii) predicting from said one or more operands whether said at least two memory accesses may be required to access said data item;

(iii) generating a prediction signal indicative of said prediction; and (iv) preventing, responsive to said prediction signal indicating that at least two memory accesses may be required, at least said memory access generation stage of said processor from receiving signals from a preceding pipeline stage whilst said at least two memory accesses are being generated.

14. The method of claim 13, wherein said one or more operands comprise a plurality of bits and said step (ii) comprises the step of:

predicting based upon a number of least significant bits of said one or more operands whether said at least two memory accesses may be required to access said data item.

15. The method of claim 14, wherein said address boundaries are arranged to delimit data comprising $2^N$ bytes and said step (ii) comprises the step of:

predicting based upon N least significant bits of said one or more operands whether said at least two memory accesses may be required to access said data item.

16. The method of claim 14, wherein said step (ii) comprises the step of:

predicting that said at least two memory accesses may be required to access said data item if any of said number of least significant bits of said one or more operands are set.

17. The method of claim 13, wherein, if said prediction signal indicates that at least two memory accesses may be required, said step (iii) comprises the step of:

generating a stall signal for propagation to each preceding pipeline stage in turn; and said step (iv) comprises the step of:

causing those pipeline stages receiving said stall signal to stall whilst said at least two aligned memory accesses are being generated by said memory access generation stage.

18. The method of claim 13, wherein at a point in time each pipeline stage either contains an instruction or does not contain an instruction, and if said prediction signal indicates that at least two memory accesses may be required, said step (iii) comprises the step of:

generating a stall signal for propagation to each preceding pipeline stage in turn until a pipeline stage containing no instruction is encountered; and said step (iv) comprises the step of:

causing those pipeline stages receiving said stall signal to stall whilst said at least two aligned memory accesses are being generated by said memory access generation stage.

19. The method of claim 13, further comprising the step of:

(v) generating a null operation following the generation of a first memory access in the event that a prediction signal indicating that at least two memory accesses may be required to access said data item was generated at step (iii), but said subsequently generated memory access for said data item indicates that said data item consists of data not on both sides of one of said address boundaries.

20. The method of claim 13, wherein said memory access generation stage takes a time 't' to generate from said memory instruction a memory access for said data item and said step (iii) generates said prediction signal from said operands in a time less than t.

* * * * *